United States Patent [19]

Keusch

[11] Patent Number: 5,287,899
[45] Date of Patent: Feb. 22, 1994

[54] BORING MACHINE, PARTICULARLY FOR WOODWORKING

[75] Inventor: Siegfried Keusch, Plochingen, Fed. Rep. of Germany

[73] Assignee: Reich Spezialmaschinen GmbH, Nürtingen, Fed. Rep. of Germany

[21] Appl. No.: 939,991

[22] Filed: Sep. 3, 1992

[30] Foreign Application Priority Data

Sep. 6, 1991 [DE] Fed. Rep. of Germany ....... 4129745

[51] Int. Cl.$^5$ ............................................. B27C 3/00
[52] U.S. Cl. .................................... 144/92; 144/1 A;
408/35; 408/52; 408/91; 269/56; 269/303; 269/315
[58] Field of Search .................. 408/35, 43, 49, 50, 408/52, 87, 91, 95; 83/467.1; 269/55, 56, 57, 303, 315; 144/1 A, 3 E, 92, 93 R, 96

[56] References Cited

U.S. PATENT DOCUMENTS 481,737  8/1892  Scheidt ................................. 144/96
3,918,825  11/1975  Alberti ................................ 144/3 E Primary Examiner—W. Donald Bray
Attorney, Agent, or Firm—W. Thad Adams, III

[57] ABSTRACT

The invention relates to a boring machine, particularly for woodworking, for boring rows of holes and structural bores in plateshaped workpieces such as cabinet sidewalls, cabinet doors, etc. with a machine frame having a workpiece holder and a boring assembly displaceable on guide rails, in which machine the workpiece holder. a workpiece stop and a stop arrangement with position fingers adjustable and lockable in the displacement direction of the boring assembly, which, in connection with the boring assembly, determine the boring position along the displacement path of the boring assembly.

Presetting of boring patterns with a number of bore rows is carried out by means of position rollers having a number of holding rails in which fingers can be prepositioned. The fingers cooperate with finger receivers to determine the positions of the boring assembly.

10 Claims, 3 Drawing Sheets

BORING MACHINE, PARTICULARLY FOR WOODWORKING

TECHNICAL FIELD AND BACKGROUND OF THE INVENTION

The invention relates to a boring machine for woodworking, for boring rows of holes and structural bores in plate-shaped workpieces such as cabinet sidewalls, cabinet doors, etc. with a machine frame having a workpiece holder and a boring assembly displaceable on guide rails, in which machine the workpiece holder, a workpiece stop and a stop arrangement with position fingers adjustable and lockable in the displacement direction of the boring assembly, which, in connection with the boring assembly, determine the boring positions along the displacement path of the boring assembly.

A boring machine of this kind is known from DE-GM 76 19 306. With this known boring machine, the boring assembly is arranged under the workpiece holder so that one cannot see into the blind-end bores. This makes operation of the known boring machine difficult. In addition, the boring assembly can be displaced in only one direction, hence the workpiece must be positioned again and again on the workpiece holder for making a number of rows of bores. For positioning the boring assembly, a slide that can be moved in the direction of displacement of the boring assembly is provided and on which a number of sensing fingers having different lengths and running in the displacement direction of the boring assembly are held in a spaced arrangement next to each other. A number of stop fingers, which can be moved vertically and which are at an angle to the sensing fingers, are provided on a supporting block fixed on guides. With this known boring machine, only one given bore is optimal with the positioned sensing and stop fingers. The change-over to another bore row is quite complicated and time-consuming.

SUMMARY OF THE INVENTION

The object of the invention is to devise a boring machine of the type mentioned at the outset in which a number of bore rows can be preset through the stop arrangement without the requirement for repositioning of the workpiece on the workpiece holder again and again.

The invention achieves this object in that the boring assembly is supported by a supporting framework with forward and rear vertical support pairs, which is displaceable on guide rails or guide shafts parallel to the forward and rear sides of the workpiece holder, in that the supporting framework is provided with a pair of horizontal guide rails, which are oriented vertically to the forward and rear sides and on which the boring assembly is adjustably guided, in that the position fingers in holding rails of a position roller can be introduced and locked in desired boring positions with a number of longitudinally oriented holding rails distributed over the circumference, in that the position roller is arranged or can be mounted parallel to the longitudinal side of the workpiece holder and cooperates with a finger receiver displaceable on the supporting framework, and in that the holding rails of the position roller with its positioned fingers can be brought as desired into the working position with the finger receiver of the supporting framework.

With this embodiment, the boring pattern for a bore row can be preset in each holding rail of the position roller. If the position roller has "n" holding rails, then "n" bore rows can be prepositioned. A number of holding rails can also be assigned to a bore row to incorporate different bores in a bore row. The boring assembly designed here as a multi-spindle boring assembly is then brought with suitable spindles into the working position.

The workpiece can be secured in place on the workpiece holder if provision is also made so that a further position roller is or can be mounted parallel to the horizontal guide rails and cooperates with the holding rails of the further position roller with its positioned fingers can be brought as desired into the working position with the finger receiver of the boring assembly. With this development, the positions of the bore rows can also be prepositioned, and the assigned position roller is set as desired on the holding rails provided with fingers.

The operation of the boring machine, that is, the setting of the boring assembly and the position rollers is facilitated in that the boring assembly is designed as a multi-spindle boring assembly, its spindles and the holding rails of the position rollers being provided with coordinated markings, which determine the assignment between the holding rails with its positioned fingers and the spindles of the multi-spindle boring assembly.

One development of the position rollers is characterized in that the holding rails basically form an undercut receiver and are combined into a one-piece shape section having "n" angles.

If the position rollers are mounted to rotate in roller bearings on the machine frame and are preferably removably mounted, then separate position rollers with preset fingers can be made available for different workpieces. In this case, only the associated position rollers need be inserted for the change-over to other workpieces. In order for the holding rails of the position rollers to be able to be set into "n" working positions in a defined way, a further development assigns each position roller a rotator with which the position roller can be rotated 360 degrees/n angular steps.

The setting of the supporting framework and the boring assembly into the working positions preset by the fingers of the holding rails is carried out precisely in that the position fingers have a frustrum-shaped head, which changes into a shape section with "n" angles and a threaded bolt, and in that the threaded bolt of the position finger is introduced through the bore of a fastening plate into the holding rail and is screwed therein into a nut held in the holding rail, the finger receivers of the supporting framework and the boring assembly being designed for the outer contour of the head of the fingers.

In order for the working position between the finger receiver the head of the finger to be cancelled and restored again, provision is made so that the finger receivers of the supporting framework and of the boring assembly can be displaced by means of hand levers in the direction of the longitudinal axis of the fingers of the holding rail of the position roller in the working position and can be brought into outer engagement with the finger in the working position.

Control of the finger receivers can also be automatic if the development is such that the finger receivers on the supporting framework and on the boring assembly are spring-mounted and lock onto the respective finger of the holding rail in the working position. The invention is explained in more detail with an example embodiment illustrated in the drawings.

DETAILED DESCRIPTION OF THE PREFERRED EMBODIMENT AND BEST MODE

Figure 1:
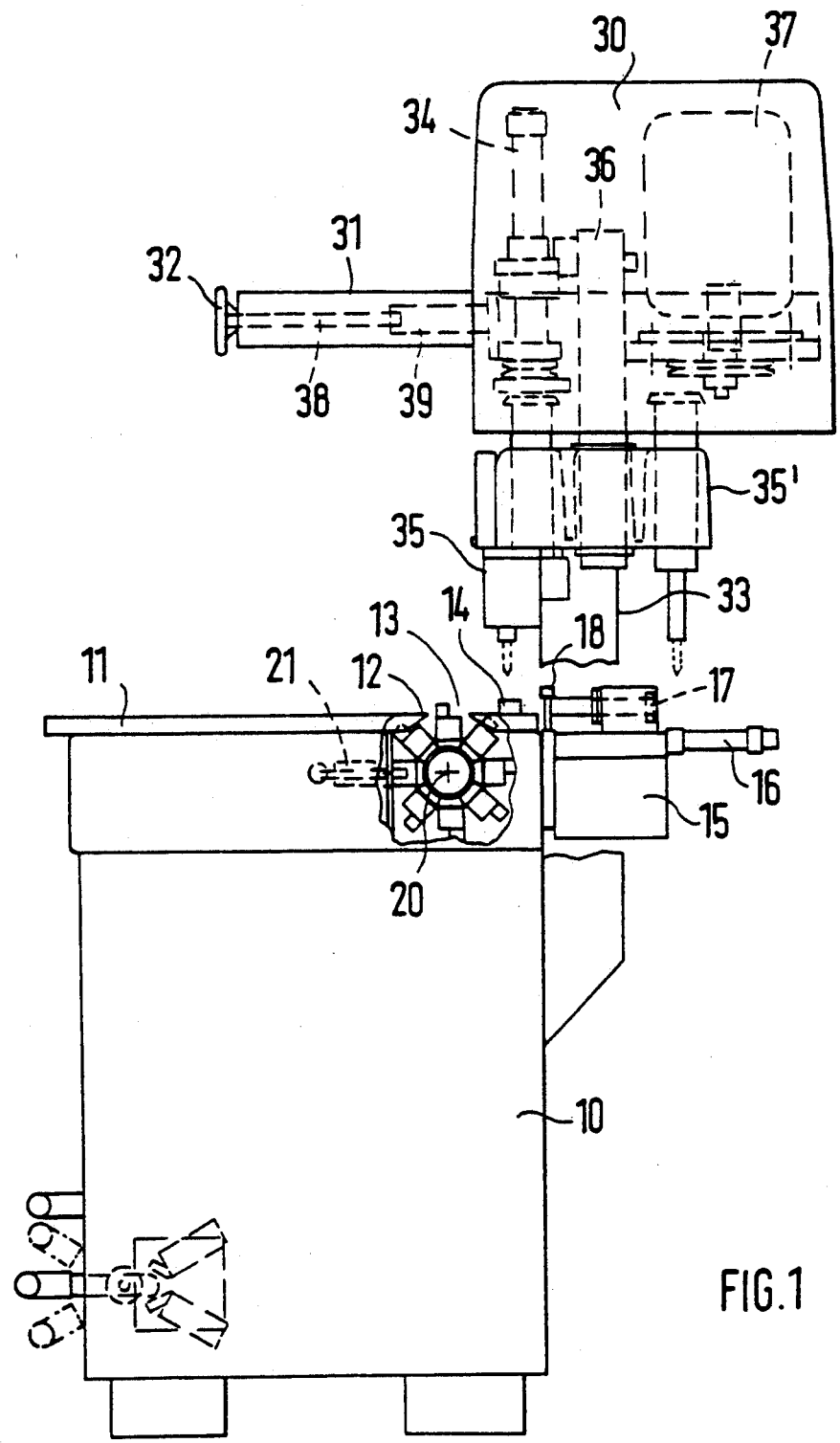
FIG. 1 is a side view of the boring machine with a multi-spindle boring assembly showing the position roller for displacement of the supporting framework of the multi-spindle boring assembly in the longitudinal direction of the workpiece holder.
Figure 2:
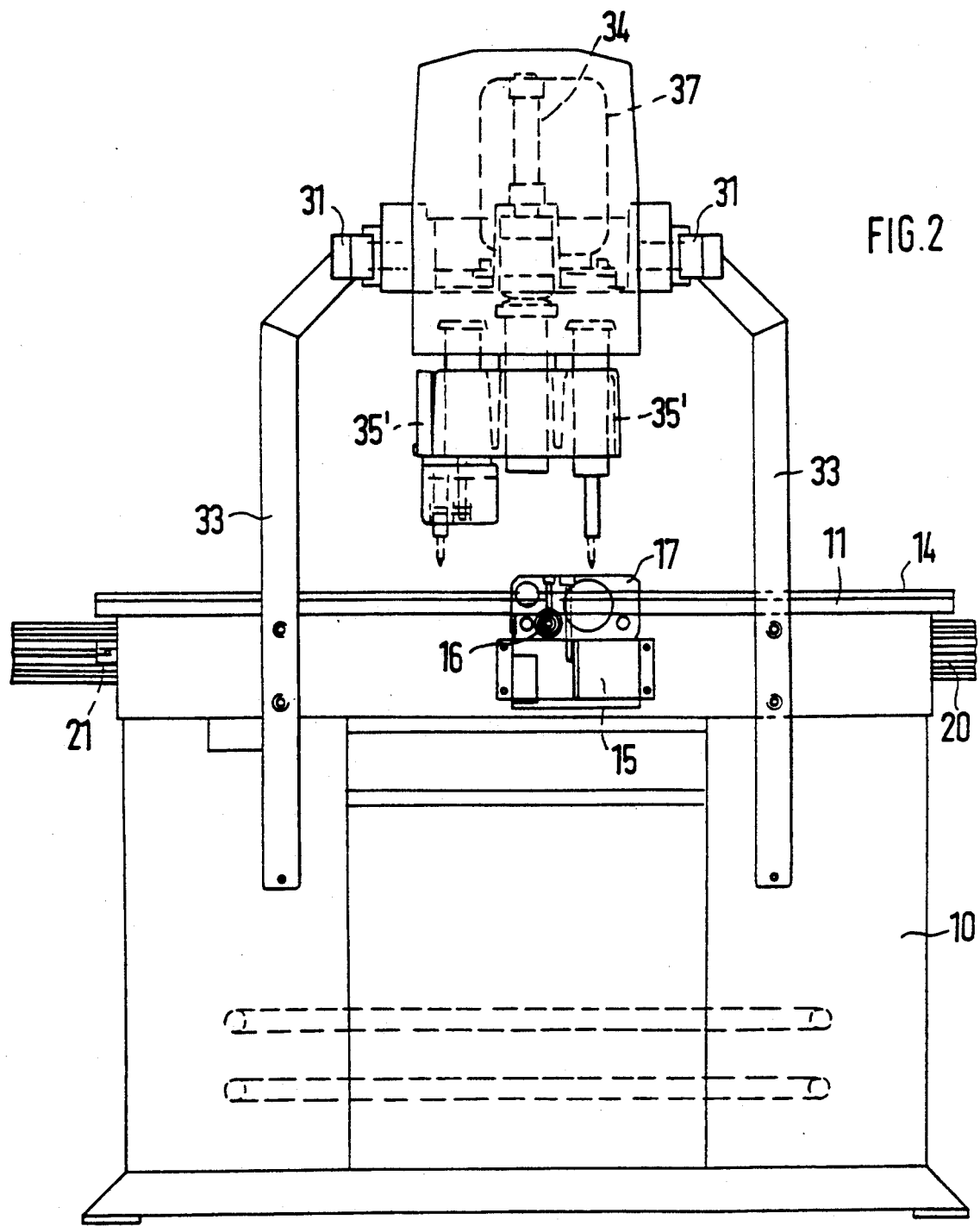
FIG. 2 is a front view of the boring machine according to FIG. 1 showing the position roller for displacement of the multi-spindle boring assembly on the horizontal guide rails of the supporting framework.

As FIG. 1 and 2 show, the boring machine has a machine frame 10, which can also have cabinet compartments and support or accommodate control equipment for the boring machine. The machine frame 10 is closed off with a workpiece holder 11, which is provided at the rear with a workpiece stop 12, which determines the position of the workpiece on the workpiece holder 11. A guide rail 13 is mounted at the top of the machine frame 10 along the front, while a guide shaft 14 is mounted along the rear.

A supporting framework is displaceable along the machine frame 10 with guide roll pairs 18 or similar equipment. This supporting framework has a pair of forward vertical supports 15 and a pair of rear vertical supports 16. Two horizontal guide rails 17 are mounted in a spaced and parallel arrangement mounted at the top of the supporting framework and vertical to the forward and rear sides of the workpiece holder 11. A multi-spindle boring assembly 20 is displaceably guided on these horizontal guide rails 17. The multi-spindle boring assembly 20 has a number of rotatably arranged spindles 21, of which one is brought into the working position and accommodates the necessary tool. The spindle 21 in the working position is operated by a drive motor and is displaced toward the workpiece by an adjuster 22. There is no need here for detailed discussion of the 20, since they are known and are not of significance for the present invention.

Mounted on the front side of the machine frame 10 are roller bearings 32, which accommodate a position roller 30. This position roller 30 always has a certain position in the axial direction and can be mounted rotatably and removably in the roller bearings 32.

Figure 3:
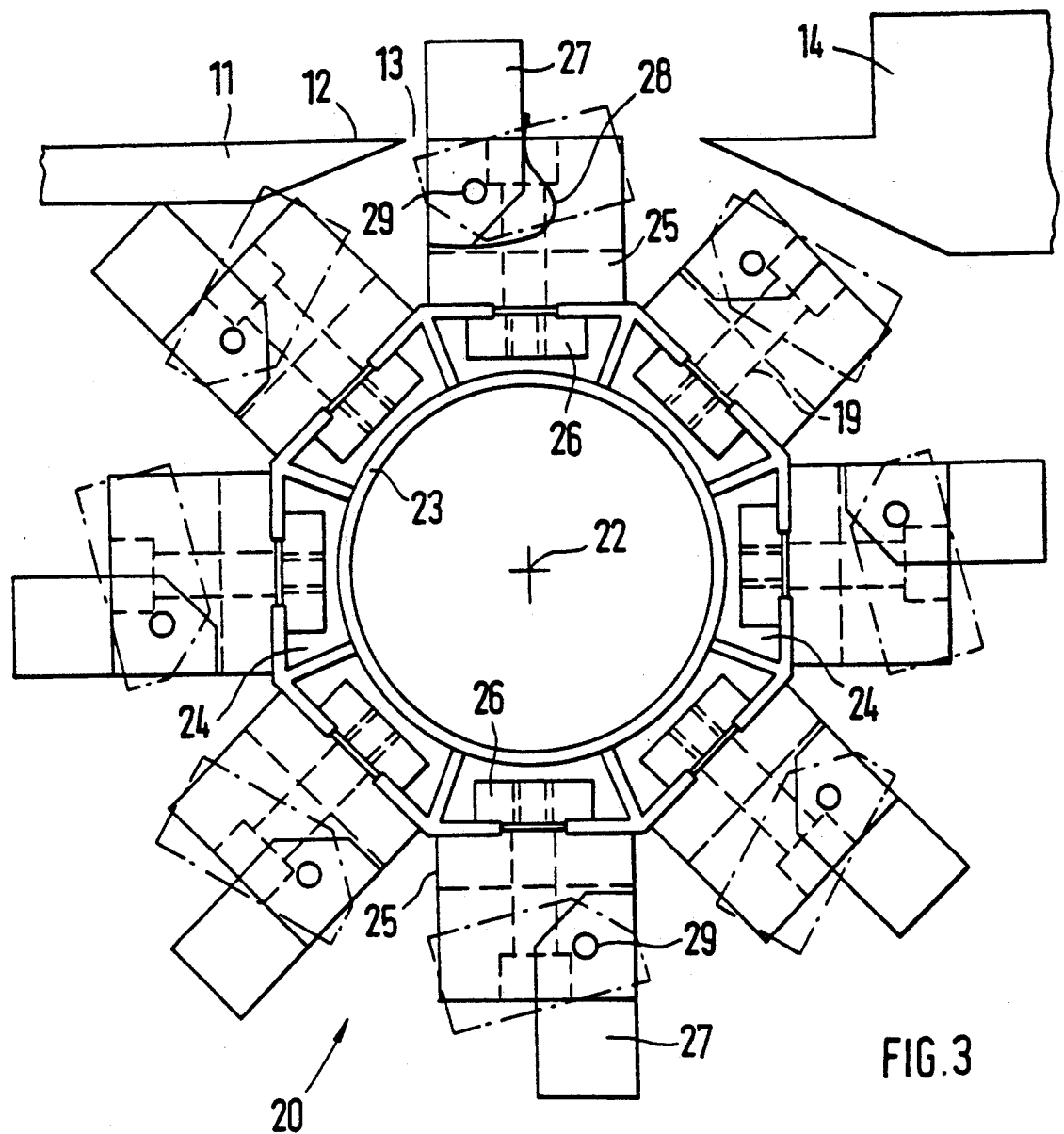
FIG. 3 is an enlarged view of the end face of a position roller.
Figure 1:
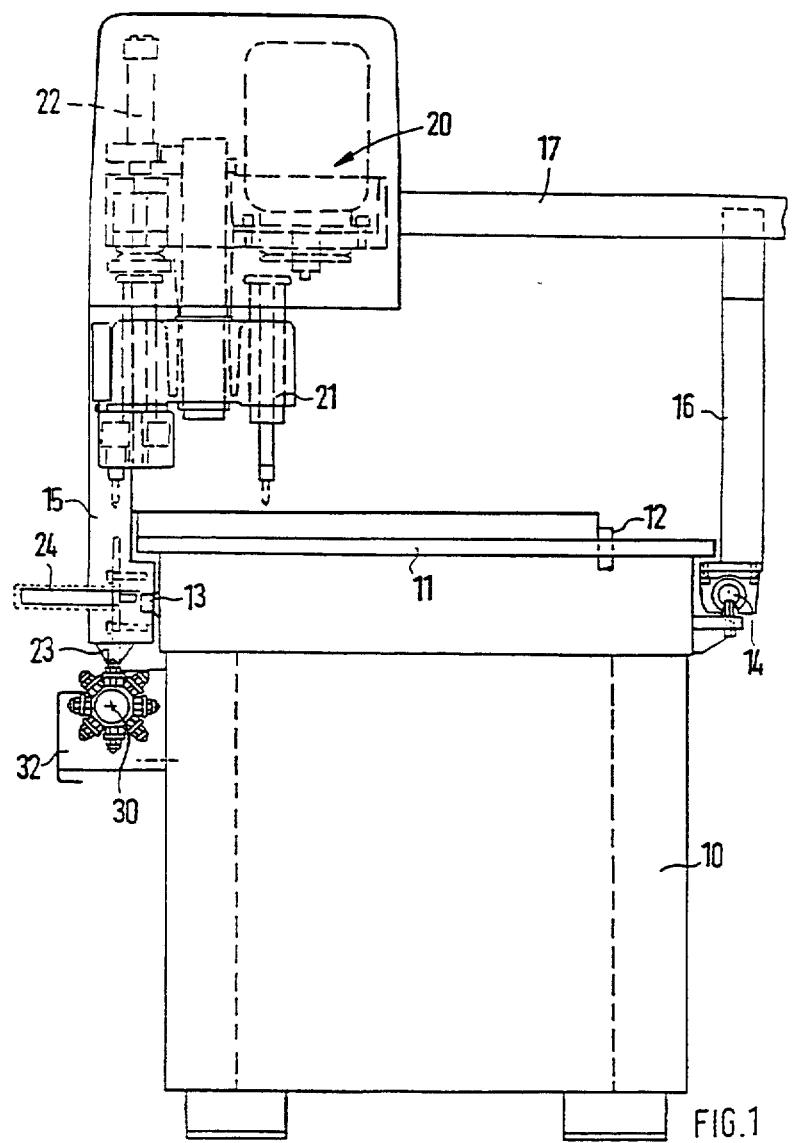
Figure 2:
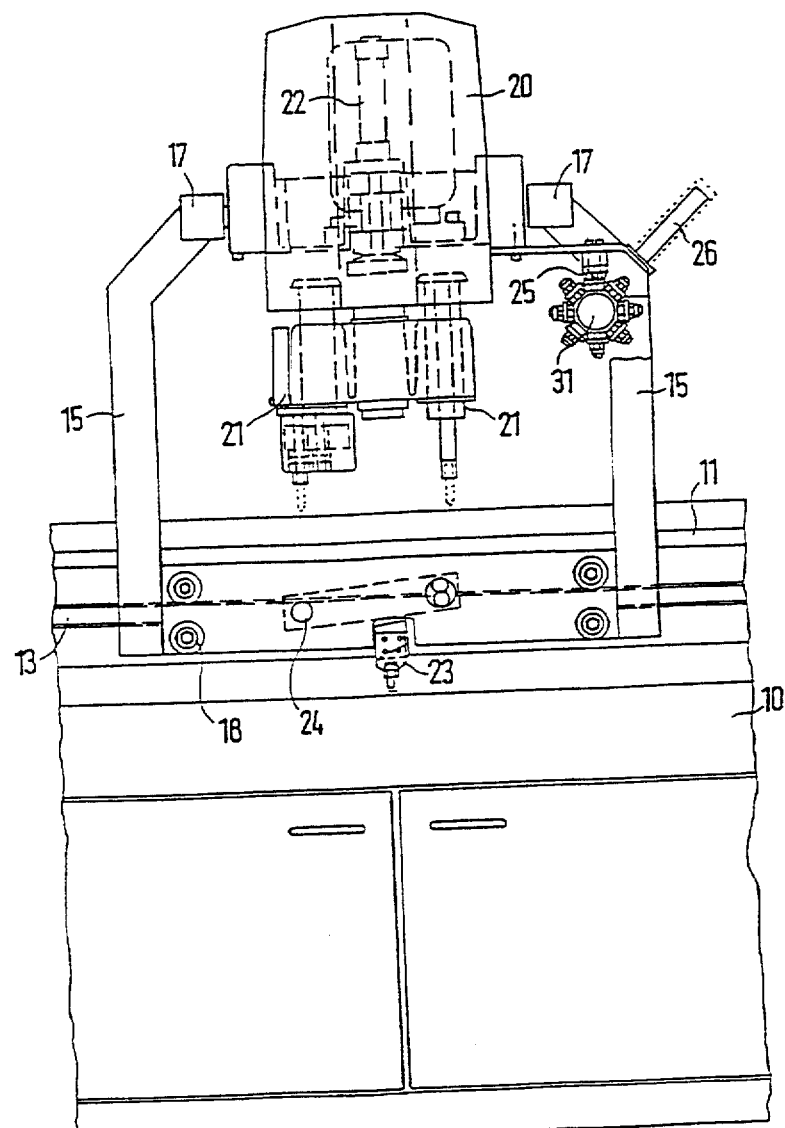
Figure 3:
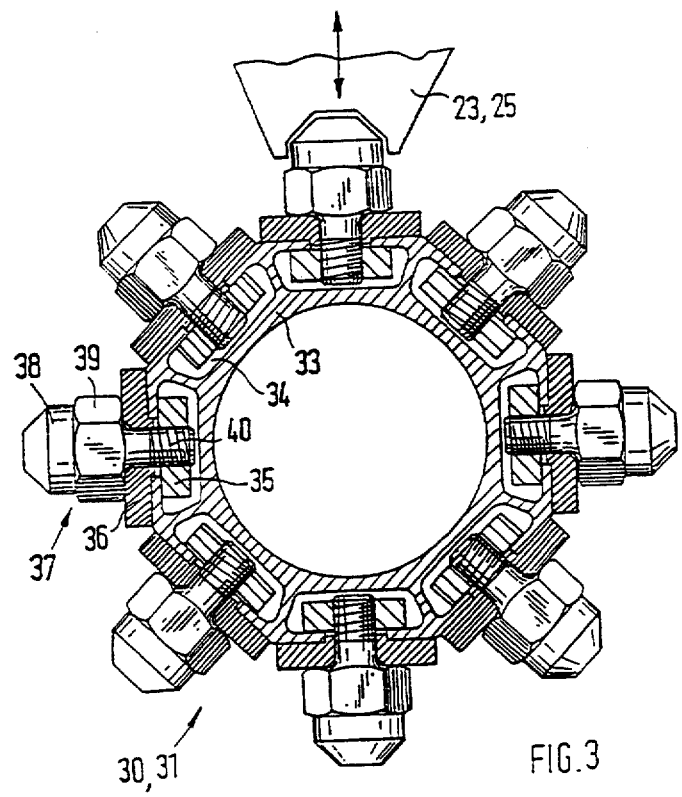

As FIG. 3 shows, the position roller 30 has a shaped section 33, which includes 8 undercut holding rails 34. In the longitudinal direction of these holding rails, fingers 37 are introduced and locked at the positions at which a bore of a row of bores is to be made. Equipping of the holding rails 34 with fingers 37 thus depends on the spacing of the bores in a row of bores. The boring patterns for eight bore rows can be preset, therefore, with the position roller 30 shown in the example embodiment. Provision is made here so that all holding rails 34 can be brought into a working position in which their positioned fingers 37 are oriented vertically upward and can cooperate with a finger receiver 23 mounted on the supporting framework. The fingers 37 have a frustrum-shaped head 38 on which a hexagonal or octagonal nut 39 and a threaded bolt 40 are secured. The threaded bolt 40 is screwed into a nut 35 guided and held in the holding rail 34 after being introduced beforehand through a bore of a fastening plate 36 into the holding rail 34. In this way, any number of fingers 37 can be secured to any points of the holding rail 34, thus presetting a desired boring pattern. A number of holding rails 34 can also be assigned here to a row of bores, the holding rails 34 being assigned other tools or other spindles 21. In this way, rows of bores with different sizes can be made in a number of displacement motions of the multi-spindle boring assembly 20 in cooperation with a number of holding rails 34 of the position roller 30.

If another workpiece is to be provided with a different bore pattern, then only the position roller 30 needs to be removed and replaced with a suitably prepositioned position roller.

For operating the boring machine, it is preferable to provide the holding rails 34 of the position roller 30 and the spindles 21 of the multi-spindle boring assembly 20 with coordinated markings. The assignment corresponding to the desired boring pattern will be correct only when the holding rail 34 with the same marking as the spindle 21 is in the working position.

The multi-spindle boring assembly 20 can be adjusted on the horizontal guide rails 17 in the simplest case by means of adjusting spindles or the like in order to be able to set the spacing from the workpiece stop 12 for the row of bores to be made.

This setting can also be made in advance, however, as shown by the position roller 31, which is arranged parallel to a horizontal guide 17. This position roller 31 also has "n" holding rails 34 for receiving fingers 37. In the working position, these fingers 37 cooperate with a finger receiver 25 mounted on the multi-spindle boring assembly 20. The spacing of the bore rows from the workpiece stop 12 can be preset with this position roller 31. The holding rails 34 of the position roller 31 can be assigned different workpieces or can be used for making rows of bores vertically with respect to the forward and rear side of the workpiece holder 11.

When the supporting framework or the multi-spindle boring assembly 20 is adjusted by means of hand levers 24 and 26, the finger receivers 23 and 25 are disengaged from the head 38 of the finger 37 so that the supporting framework or the multi-spindle boring assembly 20 can pass the finger 37 and be engaged with the next finger 37 in the holding rail 34. The working positions are maintained precisely here if the finger receivers 23 and 25 are adjusted to the outer contour of the head 38 of the finger 37.

The finger receivers 23 and 25 can also be supported by springs on the supporting framework or on the multi-spindle boring assembly 20 so that the active connection between the finger 37 and the finger receiver 23 or 25 can be automatically cancelled or restored again through application of force.

The position rollers 30 and 31 can also have a different number of holding rails 34 and different lengths. Preference is to be given in any case, however, to removable mounting on the machine frame 10 and on the supporting framework, because preset position rollers 30 and 31 can be made available for different workpieces so that the change-over of the boring machine can be carried out quite easily and rapidly using simple position rollers.

In order to set the fingers in the holding rails for the desired boring pattern, a further development provides for arrangement of strips with a graduated scale parallel to the holding rails 34 of the position rollers 30, 31 brought into the working position, said strips being hinge-mounted on the machine frame 10 or a horizontal guide rail 17 with the longitudinal sides facing away from the holding rails 34.

I claim:

1. A woodworking boring machine for boring rows of holes and structural bores in flat workpieces such as cabinet sidewalls, cabinet doors and the like; comprising
   (a) a machine frame;
   (b) a workpiece holder and a boring assembly displaceable on a pair of horizontal guide rails carried by said machine frame;
   (c) a workpiece stop and a stop arrangement carried by said machine frame and having a plurality of position fingers adjustable and lockable in the direction of displacement of the boring assembly;
   (d) a supporting framework carried by said machine frame and adjustably supporting the boring assembly on the guide rails parallel to forward and rearward sides of said workpiece holder;
   (e) a first position roller mounted parallel to a longitudinal side of said workpiece holder and having a plurality of axially-extending rail guides therein in which are respectively positioned longitudinally-extending holding rails;
   (f) said position fingers being respectively positioned on respective ones of said holding rails around the circumference of said first position roller; and
   (g) a finger receiver displaceable on said supporting framework for cooperating with a selected one of said position fingers on said first position roller for locking the position finger in a working position with relation to the boring assembly to determine the boring position of the boring assembly along the displacement path of the boring assembly in relation to the position of the workpieces holder.

2. A woodworking boring machine according to claim 1, and including:
   (a) a second position roller mounted parallel to said horizontal guide rials and cooperating with a second displaceable finger receiver mounted on the boring assembly, said second position roller including a plurality of axially-extending rial guides therein in which are respectively positioned longitudinally-extending holding rails;
   (b) a plurality of position fingers being respectively positioned on respective ones of said holding rials around the circumference of said second position roller; and
   (c) a second finger receiver displaceable on said boring assembly for cooperating with a selected one of said position fingers on said second position roller for locking the second position finger in a working position with relation to the boring assembly to determine the boring position of the boring assembly along the displacement path of the boring assembly in relation to the position of the workpiece holder.

3. A woodworking boring machine according to claim 1, wherein said boring assembly comprises a plurality of spindles defining a multi-spindle boring assembly and includes coordinated markings on said plurality of spindles and on said holding rails which identify the assignment between said holding rails and the position fingers carried thereby and the spindles of said multi-spindle boring assembly.

4. A woodworking boring machine according to claim 3, wherein said rails comprise undercut areas in the periphery of said position roller.

5. A woodworking boring machine according to claim 2 or 4, wherein said first and second position rollers are each removably rotatably mounted in respective roller bearing assemblies carried by said machine frame.

6. A woodworking boring machine according to claim 5, wherein said first and second position rollers are each rotatable in a plurality of angular steps corresponding to the number of position fingers positioned around the periphery thereof.

7. A woodworking boring machine according to claim 6, wherein said position fingers includes a frustrum-shaped head defining a predetermined plurality of flat angles around the periphery thereof.

8. A woodworking boring machine according to claim 6, wherein the finger receivers include a concavity having a shape for matingly receiving the frustrum-shaped head of the position fingers.

9. A woodworking boring machine according to claim 8, and including first and second hand levers for displacing the finger receivers of the respective first and second position rollers in the direction of the longitudinal axis of the holding rials of the first and second position rollers for bringing the finger receivers into engagement with a position finger.

10. A woodworking boring machine according to claim 8, and including spring-loading means for spring-mounting said first and second finger receivers.

* * * * *

UNITED STATES PATENT AND TRADEMARK OFFICE
CERTIFICATE OF CORRECTION

PATENT NO. : 5,287,899
DATED : Feb. 22, 1994
INVENTOR(S) : Siegfried Keusch

It is certified that error appears in the above-identified that said Letters Patent is hereby corrected as shown below:

The title page should be deleted to appear as per attached title page.

The sheets of drawings consisting of figures 1-3, should be deleted to appear as per attached figures 1-3.

Signed and Sealed this

Ninth Day of August, 1994

Attest:

BRUCE LEHMAN

*Attesting Officer*　　　*Commissioner of Patents and Trademarks*

United States Patent [19]
Keusch

[11] Patent Number: 5,287,899
[45] Date of Patent: Feb. 22, 1994

[54] BORING MACHINE, PARTICULARLY FOR WOODWORKING

[75] Inventor: Siegfried Keusch, Plochingen, Fed. Rep. of Germany

[73] Assignee: Reich Spezialmaschinen GmbH, Nürtingen, Fed. Rep. of Germany

[21] Appl. No.: 939,991

[22] Filed: Sep. 3, 1992

[30] Foreign Application Priority Data

Sep. 6, 1991 [DE] Fed. Rep. of Germany ...... 4129745

[51] Int. Cl.$^5$ .................................. B27C 3/00
[52] U.S. Cl. .................................. 144/92; 144/1 A; 408/35; 408/52; 408/91; 269/56; 269/303; 269/315
[58] Field of Search .............. 408/35, 43, 49, 50, 408/52, 87, 91, 95; 83/467.1; 269/55, 56, 57, 303, 315; 144/1 A, 3 E, 92, 93 R, 96

[56] References Cited

U.S. PATENT DOCUMENTS 481,737  8/1892  Scheidt .................. 144/96
3,918,825  11/1975  Alberti ................. 144/3 E Primary Examiner—W. Donald Bray
Attorney, Agent, or Firm—W. Thad Adams, III

[57] ABSTRACT

The invention relates to a boring machine, particularly for woodworking, for boring rows of holes and structural bores in plateshaped workpieces such as cabinet sidewalls, cabinet doors, etc. with a machine frame having a workpiece holder and a boring assembly displaceable on guide rails, in which machine the workpiece holder, a workpiece stop and a stop arrangement with position fingers adjustable and lockable in the displacement direction of the boring assembly, which, in connection with the boring assembly, determine the boring position along the displacement path of the boring assembly.

Presetting of boring patterns with a number of bore rows is carried out by means of position rollers having a number of holding rails in which fingers can be prepositioned. The fingers cooperate with finger receivers to determine the positions of the boring assembly.

10 Claims, 3 Drawing Sheets

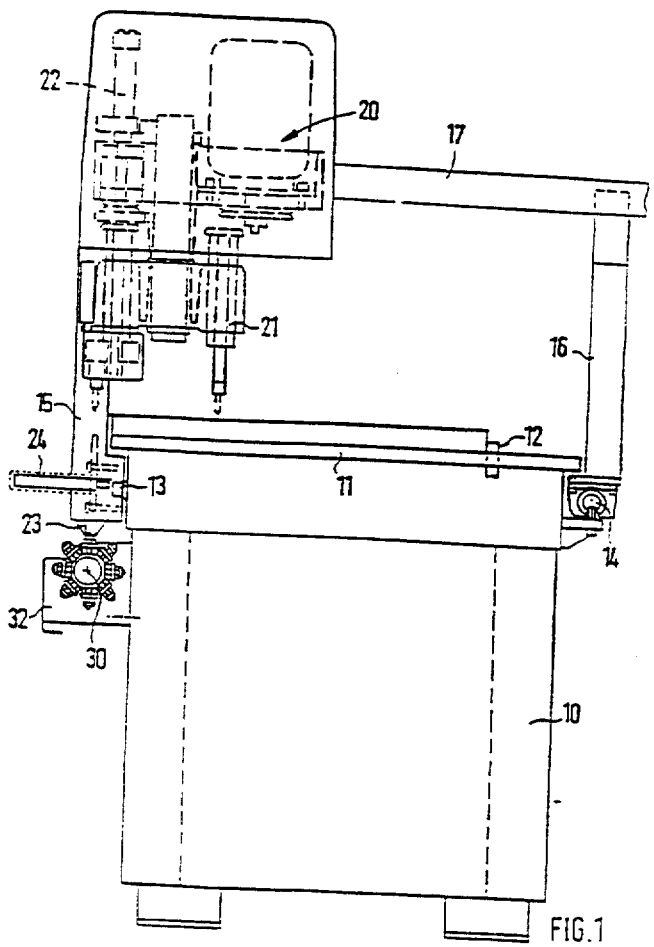

FIG. 1